United States Patent [19]
Ostrowski et al.

[11] Patent Number: 6,050,297
[45] Date of Patent: Apr. 18, 2000

[54] BREAKAWAY HOSE COUPLING FOR FUEL DISPENSERS

[75] Inventors: Gary M. Ostrowski, Salisbury, Md.; James David DiRocco, Delmar, Del.

[73] Assignee: Dresser Industries, Inc., Dallas, Tex.

[21] Appl. No.: 09/193,571

[22] Filed: Nov. 17, 1998

[51] Int. Cl.[7] .................................................. F16L 37/28
[52] U.S. Cl. .............................. 137/614.04; 137/614.03
[58] Field of Search .................. 137/614.04, 614.03, 137/614, 614.02; 251/149.6

[56] References Cited

U.S. PATENT DOCUMENTS

| | | |
|---|---|---|
| 2,397,265 | 3/1946 | Jacobsson et al. . |
| 3,097,867 | 7/1963 | Saloum . |
| 3,211,178 | 10/1965 | Kiszko . |
| 3,435,848 | 4/1969 | Johnston . |
| 3,520,331 | 7/1970 | Locke et al. . |
| 4,402,533 | 9/1983 | Ortloff . |
| 4,691,941 | 9/1987 | Rabushka et al. . |
| 4,763,383 | 8/1988 | Estkowski et al. . |
| 4,779,638 | 10/1988 | Nitzberg et al. . |
| 4,791,961 | 12/1988 | Nitzberg et al. . |
| 4,800,913 | 1/1989 | Nitzberg et al. . |
| 4,827,960 | 5/1989 | Nitzberg et al. . |
| 4,827,961 | 5/1989 | Nitzberg et al. . |
| 4,827,977 | 5/1989 | Fink, Jr. .............................. 137/614.04 |
| 4,896,688 | 1/1990 | Richards et al. .................... 137/614.04 |
| 4,905,733 | 3/1990 | Carow . |
| 5,014,732 | 5/1991 | Nitzberg . |
| 5,018,546 | 5/1991 | Carmack et al. . |
| 5,285,807 | 2/1994 | Nitzberg . |
| 5,433,247 | 7/1995 | Guertin . |
| 5,494,074 | 2/1996 | Ramacier, Jr. et al. ........... 137/614.04 |
| 5,564,471 | 10/1996 | Wilder et al. ....................... 137/614.04 |
| 5,566,714 | 10/1996 | Miller ................................. 137/614.04 |
| 5,570,719 | 11/1996 | Richards et al. . |
| 5,615,706 | 4/1997 | Guertin . |
| 5,695,221 | 12/1997 | Sunderhaus . |
| 5,771,927 | 6/1998 | Johansen et al. .................. 137/614.04 |

*Primary Examiner*—Gregory L. Huson
*Assistant Examiner*—Joanne Y. Kim
*Attorney, Agent, or Firm*—Haynes & Boone, L.L.P.

[57] ABSTRACT

A breakaway hose coupling according to which a removable housing is detachably connected to a fixed housing. A sealing member in the fixed housing is urged towards a seat in the fixed housing to prevent fluid flow through the fixed housing, and a member in the second housing is urged into engagement with the sealing member in the first housing to urge the latter sealing member away from the seat. The connection between the housings is released in response to a predetermined force acting on the second housing and the member in the second housing disengages from the sealing member in the first housing. As a result, the sealing member in the first housing is urged against the seat to prevent fluid flow through the fixed housing.

4 Claims, 4 Drawing Sheets

BREAKAWAY HOSE COUPLING FOR FUEL DISPENSERS

BACKGROUND OF THE INVENTION

This invention relates to a breakaway hose coupling for fuel dispensers and, more particularly, to such a coupling for releasably coupling a conduit at a fuel dispensing unit to a hose connected to a nozzle for dispensing the fuel.

Service stations having one or more gasoline dispensing units have long had a problem with vehicles pulling away from the dispensing unit with the dispensing nozzle still inserted in the vehicle's tank, or with the nozzle or dispensing hose otherwise secured or hung on the vehicle. Such incidents usually result in damage to the dispensing unit and/or breakage of the dispensing hose, and repairing the resulting damage to the dispensing pump or hose can be very costly. Further, the fuel spillage which can result from such damage can create hazardous conditions.

These problems are compounded in connection with service stations which also include a system for recovering vapor in the vehicle tanks when the gasoline is dispensed into the tank. Although breakaway couplings have been designed for these type of gasoline dispensing and vapor recovery systems that provide for flow-through fluid communication of both fuel and recovered fuel vapor (such as the coupling disclosed in U.S. Pat. No. 5,209,262) they are less than satisfactory. For example, these type of couplings are relatively heavy, bulky and expensive and often impede the flow of the fuel and/or vapor to and from the dispensing unit.

Therefore, what is needed is a breakaway coupling of the above type which disengages and terminates the flow of fuel and vapor from a gasoline dispensing unit in response to disengaging force in excess of a predetermined value being exerted on the coupling, yet is light, compact and inexpensive and does not impede the flow of fuel or vapor.

SUMMARY OF THE INVENTION

Therefore, the breakaway hose coupling of the present invention includes a removable housing detachably connected to a fixed housing. A sealing member in the fixed housing is urged towards a seat in the fixed housing to prevent fluid flow through the fixed housing, and a member in the second housing is urged into engagement with the sealing member in the first housing to urge the latter sealing member away from the seat. The connection between the housings is released in response to a predetermined force acting on the second housing and the member in the second housing disengages from the sealing member in the first housing. As a result, the sealing member in the first housing is urged against the seat to prevent fluid flow through the fixed housing.

The coupling of the present invention enjoys the advantage of disengaging and terminating the flow of fluid and vapor from a gasoline dispensing device in response to disengaging force in excess of a predetermined value being exerted on the coupling. The coupling of the present invention is also light, compact and inexpensive to manufacture and maintain, and does not impede flow of the fuel or vapor.

DESCRIPTION OF THE PREFERRED EMBODIMENT

Figure 1:
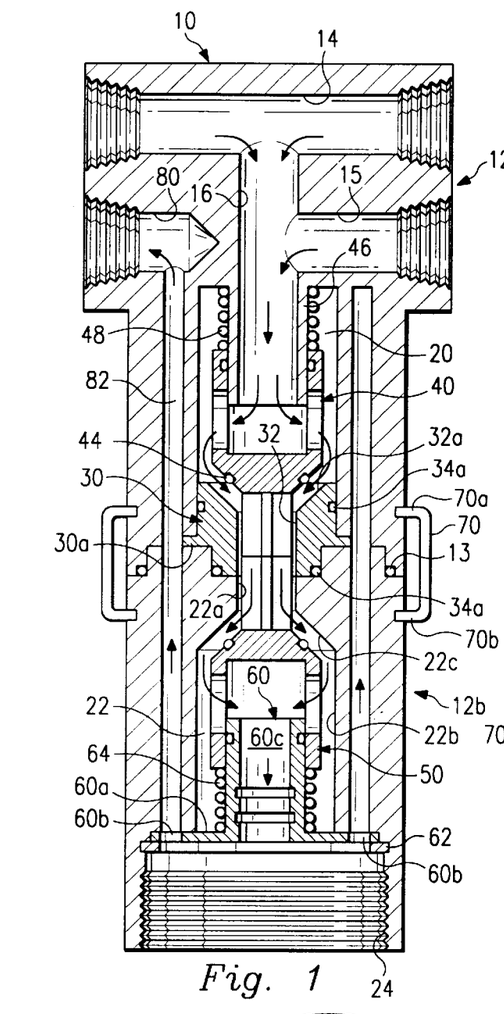
FIG. 1 is a sectional view of the coupling of the present invention shown in its normal assembled condition.

Referring to FIG. 1 of the drawings, the reference numeral 10 refers, in general, to the coupling of the present invention which includes an upper housing portion 12a as viewed in the drawing, and a lower housing portion 12b. Although not shown in the drawings, it is understood that the upper housing portion 12a is bolted, or otherwise attached, to a dispensing unit at a gasoline service station, or the like, and the lower housing portion 12b is connected to the upper housing portion in a manner to be described. The lower end of the housing portion 12a abuts the upper end of the housing portion 12b, and a seal ring 13 extends between the abutting ends.

The housing portion 12a has an enlarged upper end portion having a transverse bore 14 extending therethrough, with its respective end portions being internally threaded for connection to two conduits (not shown). A radial bore 15 extends into the housing portion 12a in a spaced, parallel relation to the bore 14 and is also internally threaded for connection to a conduit (not shown). It is understood that three sources of gasoline, normally stored in underground storage tanks, are connected to these conduits and are selectively introduced to the respective ends of the bore 14, and to the end of the bore 15. Therefore, when a customer selects one of the gasolines by actuating a switch, or the like, the selected gasoline flows from its storage tank to one if the end of the bore 14 or the end of the bore 15 for passage through the coupling 10 in a manner to be described.

An axial bore 16 extends through a portion of the housing portion 12a with its upper end in registry with the bores 14 and 15 and its lower end extending into a chamber 20 formed in the housing portion 12a. The upper end portion of the chamber 20 surrounds a portion of the bore 16 and the lower end of the chamber 20 extends to the lower end of the housing portion 12a. A chamber 22 is formed in the housing portion 12b and is in axial alignment with the chamber 20 of the housing portion 12a. The inner surface of the housing portion 12b defining the chamber 22 is configured so as to define an upper portion 22a having a relatively small diameter, a lower portion 22b having a relatively large diameter, and a tapered portion 22c connecting the upper portion to the lower portion. The upper end of the upper chamber portion 22a registers with the chamber 20 of the upper housing portion 12a, and the lower end of the lower chamber portion 22b registers with an enlarged, internally threaded bore 24 for receiving a hose assembly as will be explained.

Fuel from a storage tank thus flows into the housing portion 12a through one of the ends of the bore 14, or the end of the bore 15, before entering the bore 16 and flowing through the chamber 20 and 22 of the housing portions 12a and 12b, respectively, in a manner to be described. It is understood that the above-mentioned hose assembly includes a fixture that connects to the bore 24, and an inner hose extending from the fixture for receiving the fuel and passing it to a dispensing nozzle for discharging the fuel into a vehicle tank.

A substantially ring-shaped seating member 30 is disposed in the chamber 20 of the upper housing portion 12a and its lower end portion extends into a counterbore formed in the upper end portion of the lower housing portion 12b. A flange 30a is formed on the outer surface of the member 30 and extends between the corresponding ends of the housing portions 12a and 12b to secure the member relative to the housing portions. The member 30 has a through bore 32 that has an outwardly tapered upper end portion 32a. Two sealing rings 34a and 34b are provided in grooves formed in the outer surface of the member 30 and engage corresponding surfaces of the housing portion 12a and the housing portion 12b, respectively.

Figure 1A:
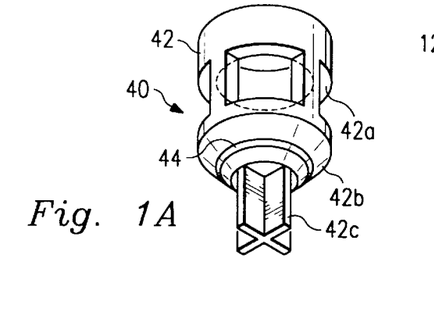
FIG. 1A is an isometric view of a component of the coupling of FIG. 1.

A sealing member 40 is mounted for reciprocal movement in the chamber 20 and is better shown in FIG. 1A. The member 40 is in the form of a cylinder 42 having four angularly-spaced windows 42a extending therethrough. The base 42b of the cylinder 42 is tapered in a manner to correspond to the taper of the end portion 32a of the bore 32a of the seating member 30. The member 40 also includes a crosspiece 42c that extends from the base 42b and has an X-shaped cross section. In the assembled position of the coupling 10 shown in FIG. 1, a portion of the cross-piece 42c of the member 40 extends in the bore 32 of the member 30, and the tapered base 42b extends in a slightly-spaced relation to the tapered end portion 32a of the bore 32 to permit fuel flow therebetween as will be further described. A seal ring 44 is fitted in a groove formed in the outer surface of the base 42b for sealingly engaging the tapered end portion 32a of the seating member under conditions to be described.

A cylindrical flange 46 is formed in the housing portion 12a and defines the bore 16. The flange 46 extends within the upper end portion of the sealing member 40 to support it for axial movement in the chamber 22 as will be described. A spring 48 extends around the flange 46 and engages the upper end of the sealing member 40 and urges it downwardly, for reasons to be described.

A sealing member 50 is mounted for reciprocal movement in the chamber 22 and, since it is identical to the sealing member 40, it will be not be described in detail. The sealing member 50 is disposed in the chamber 22 in an inverted position when compared to the sealing member 40. In the assembled position of the coupling 10 shown in FIG. 1, the tapered base of the sealing member 50 is in a slightly-spaced relation to the tapered chamber portion 22c, and the end of the cross-piece of the member 50 abuts the end of the cross-piece 42c of the member 40

A cylindrical adapter 60 is secured in the lower chamber portion 22b and has an outwardly-extending flange 60a at its lower end that is engaged by a retaining ring 62 that is secured in the upper end of the bore 24 to retain the adapter in the chamber. A plurality of angularly-spaced openings, two of which are shown by the reference numeral 60b, are formed through the flange 60a, for reasons to be described. The adapter 60 has an axial bore 60c that registers with the chamber portion 22b and the bore 24 for reasons to be described.

The lower portion of the cylinder of the sealing member 50 extends over the upper end portion of the adapter 60 so that the adapter supports and guides the sealing member during its movement in the chamber 22, as will be described. A spring 64 extends between the flange 60a of the adapter 60 and the lower end of the member 50 to urge the latter member upwardly into engagement with the sealing member 40. The springs 48 and 64 are designed so that they maintain the sealing members 40 and 50 in a slightly-spaced position from the tapered bore portion 32a of the seal member 30 and the tapered chamber portion 22b, respectively, in the assembled position of the coupling 10 shown in FIG. 1.

A cylindrical retaining collar 70 extends around the lower end portion of the housing portion 12a and the upper end portion of the housing portion 12b. The collar 70 has two inwardly-directed flanges 70a and 70b that extend in annular grooves formed in the housing portions 12a and 12b, respectively. The design of the collar 70 is such that it normally secures the housing portions 12a and 12b in the assembled position shown in FIG. 1 yet will break in response to a disengaging force in excess of a predetermined value being exerted on the coupling 10 to release the housing portion 12b from the portion 12a as will be described.

A radial bore 80 extends into the enlarged end portion of the housing portion 12a and is adapted to be connected, at its end, to a conduit (not shown) extending from one of the above-mentioned storage tanks for passing vapor recovered from the above gasoline dispensing nozzle back to the storage tank. To this end, a crescent shaped passage 82 is formed through the housing portions 12a and 12b, with its lower end registering with the openings 60b in the flange 60a and its upper end registering with the bore 80. It is understood that the above-mentioned hose assembly includes an outer hose connected to the above-mentioned fixture and registering with the passage 82 for introducing vapor from the vehicle tank into the passage. Vapor from the vehicle tank thus passes from the above-mentioned dispensing nozzle and hose into the bore 24 and the passage 82 before passing through the latter passage and exiting the bore 80 into a conduit connected to the latter bore for passage to a storage tank.

The design is such that the counteracting forces of the springs 46 and 64 maintain the sealing members 40 and 50 in their positions shown in FIG. 1, i.e., with the tapered surfaces 42b of the member 40 and the tapered surface of the member 50 in a spaced relation to the tapered bore portion 32a and the tapered chamber portion 22c, respectively. When fluid is introduced to one of the ends of the bore 14 or into the bore 15, it flows into and through the axial bore 16 and into the interior of the sealing member 40 in the chamber 20, as shown by the solid flow arrows. The fuel then passes radially outwardly through the windows 42a of the cylinder 42 of the sealing member 40 and through the passage defined between the outer tapered surface of the base member 42b and the tapered bore portion 32a. From the latter passage, the fuel passes axially downwardly and through the spaces defined between the cross-piece 42b of the member 40 and the corresponding surface of the member 30 defining the bore 32.

The fuel then enters the lower housing portion 12b and passes through the spaces defined between the cross-piece of the member 50 and the corresponding inner surfaces of the housing portion 12b. From the latter spaces, the fuel flows in the passage defined between the tapered outer surface of the member 50 and the surface of the housing portion 12b defining the tapered chamber portion 22c. The fuel then passes radially inwardly through the windows in the member 50 into and through the cylinder of the latter member, and into the bore 60a of the adapter 60. The fuel then flows into the bore 24 and exits the coupling 10 by passing into the above-mentioned inner hose of the hose assembly connected to the bore 24 for dispensing, via a nozzle connected to the latter hose, into a vehicle tank. It is understood that a pump, or the like, would be provided to pump the fuel, in a conventional manner.

Vapor passes from the vehicle tank via a vapor recovery hose also connected to the above dispensing nozzle, through the outer hose of the above-mentioned hose assembly into the bore 24 and upwardly through the passage 82 and the housing portions 12a and 12b as shown by the dashed flow arrows. The vapor then exits the coupling 10 via the bore 80 and passes, via a conduit connected to the latter bore, to the underground storage tank. It is understood that a vacuum pump, or the like, would be provided, to induce this flow of vapor, in a conventional manner.

Figure 2:
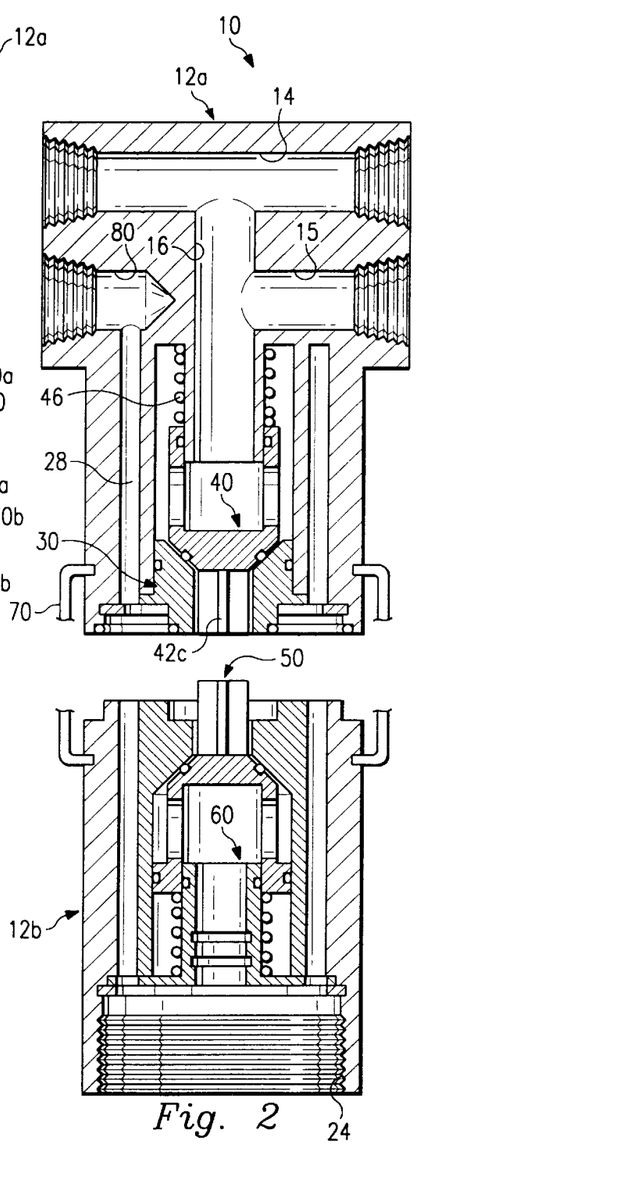
FIG. 2 is a sectional view of the coupling of FIG. 1 in its separated condition.

In the event a vehicle being serviced pulls away from the dispensing unit with the dispensing nozzle still inserted in the vehicle's tank, or with the nozzle or dispensing hose otherwise secured or hung on the vehicle, a force is exerted on the housing portion 12b by virtue of it being connected to the hose extending from the nozzle. This causes the collar 70 to break and thus releases the housing portion 12b from the housing portion 12a as shown in FIG. 2. In this released position, the sealing members 40 and 50 are no longer in engagement, and the spring 48 thus urges the sealing member 40 into sealing engagement with the tapered bore portion 32a to block any of the above-described flow of the fuel and the vapor through the housing portion 12a and thus prevent spillage of the hazardous fuel.

After the dispenser is turned off and the pressure is relieved, the body portions 12a and 12b can be reassembled and the collar 70 replaced with a new collar which is used to reconnect the housing portions 12a and 12b as described above.

The coupling 10 of the present invention thus enjoys the advantage of disengaging and terminating the flow of fluid and vapor from a gasoline dispensing device in response to disengaging force in excess of a predetermined value being exerted on the coupling. The coupling of the present invention is also light, compact and inexpensive to manufacture and maintain, and does not impede flow of the fuel or vapor.

Figures 3, 3A, 4:
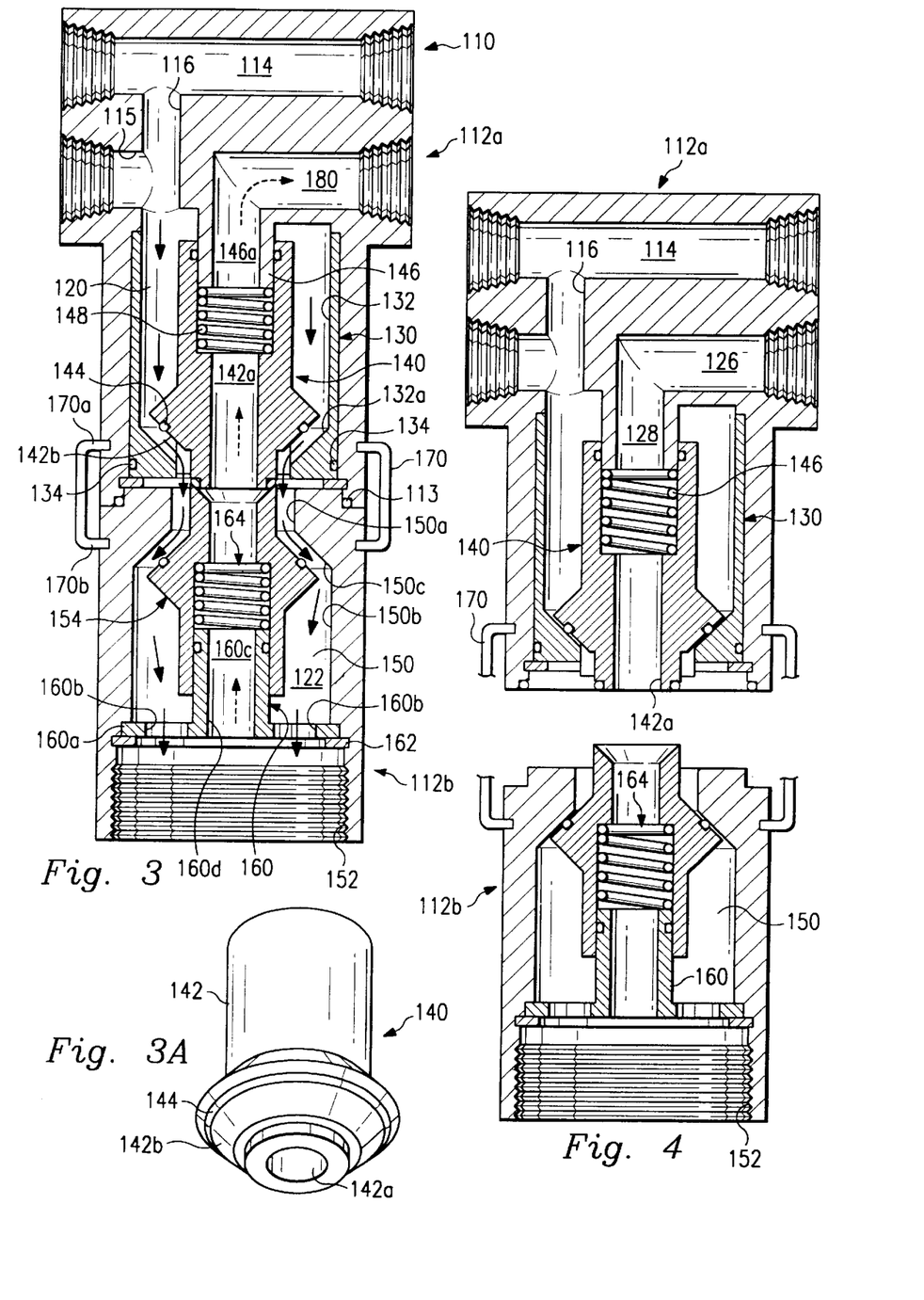
FIG. 3 is a sectional view of a coupling according to an alternate embodiment of the present invention shown in its normal assembled condition.
FIG. 3A is an isometric view of a component of the coupling of FIG. 3.
FIG. 4 is a sectional view of the coupling of FIG. 3 in its separated condition.

An alternate embodiment of the present invention is shown in FIGS. 3, 3A and 4. The coupling according to this embodiment is referred to, in general by the reference numeral 110 and includes an upper housing portion 112b as viewed in the drawing, and a lower housing portion 112b. Although not shown in the drawings, it is understood that the upper housing portion 112a is bolted, or otherwise attached, to a dispensing unit at a gasoline service station, or the like; and the lower housing portion is connected to the upper housing portion in a manner to be described. The lower end of the housing portion 112a abuts the upper end of the housing portion 112b, and a seal ring 113 extends between the abutting ends.

The housing portion 112a has an enlarged upper end portion having a transverse bore 114 extending therethrough with it respective end portions being internally threaded for connection to two conduits (not shown). A radial bore 115 extends into the housing portion 112a in a spaced, parallel relation to the bore 114 and is also internally threaded for connection to a conduit (not shown). It is understood that three sources of gasoline, normally stored in underground storage tanks, are connected to these conduits and are selectively introduced to the respective ends of the bore 114, and to the end of the bore 115, all in a conventional manner.

An axial bore 116 registers with the bores 114 and 115 and extends to a chamber 120 formed in the upper housing portion 112a. A cylindrical seating member 130 is disposed in the chamber 120, and has a through axial bore 132 having a tapered lower portion 132a. A seal ring 134 is provided in a groove formed in the outer surface of the cylinder portion 142b and engages a corresponding surface of the housing portion 112a.

A sealing member 140 is mounted for reciprocal movement in the chamber 120 and is better shown in FIG. 3A. The member 140 is in the form of a cylinder 142 having a through bore 142a and an enlarged base 142b which is tapered in a manner to correspond to the tapered portion 132a of the bore 132 of the seating member 130. In the assembled position of the coupling 110 shown in FIG. 3, the tapered base 142b of the member 140 extends in a slightly-spaced relation to the tapered bore portion 132a to permit fuel flow therebetween as will be further described. A seal ring 144 is fitted in a groove formed in the outer surface of the base 142b for sealingly engaging the tapered bore portion 132a under conditions to be described.

A cylindrical flange 146 is formed in the housing portion 112a and is surrounded by the chamber 120. The flange 146 defines a bore 146a and extends within the upper end portion of the sealing member 140 to support it for axial movement in the chamber 122. A spring 148 extends between the distal end of the flange 148 and a shoulder formed in the inner surface of the sealing member 140 to urge the latter member downwardly, for reasons to be described. The bore 146a of the flange 146 registers with the bore 142a of the sealing member 142.

A chamber 150 is formed in the housing portion 112b and is in axial alignment with the chamber 120 of the housing portion 120a. The inner surface of the housing portion 112b defining the chamber 150 is configured so as to define an upper portion 150a having a relatively small diameter, a lower portion 150b having a relatively large diameter, and a tapered portion 150c connecting the upper portion to the lower portion. The lower end of the lower chamber portion 150b registers with an enlarged, internally threaded bore 152 for receiving a hose assembly comprising an inner and an outer hose, as will be explained.

A sealing member 154 is mounted for reciprocal movement in the chamber 150 and, since it is identical to the sealing member 140, it will be not be described in detail. The sealing member 154 is disposed in the chamber 150 in an inverted position when compared to the sealing member 140. In the assembled position of the coupling 110 shown in FIG. 3, the tapered base of the sealing member 154 is in a slightly-spaced relation to the tapered chamber portion 150c and the upper end of the member 154 abuts the lower end of the member 140.

A cylindrical adapter 160 rests in the lower portion of the chamber 150 of the housing portion 112b and has an outwardly-extending flange 160a at its lower end that is engaged by a retaining ring 162 that is secured in the upper end of the bore 118 to retain the adapter in the chamber. A plurality of angularly-spaced openings 160b, two of which are shown in FIG. 3, are formed through the flange 160a that register with the chamber 150 and the bore 152. The adapter 160 has an axially-extending bore 160c extending for the length thereof that registers with the bore of the sealing member 154. Thus, a continuous bore is defined that includes the latter two bores as well as the bore 142a of the sealing member 142 and the bore 146a of the flange 146 and the bore 180 in the upper housing portion 112a.

The lower portion of the cylinder of the sealing member 154 extends over the upper end portion of the adapter 160 to permit slidable movement therebetween. One end of a spring 164 abuts a shoulder formed in the internal surface of the sealing member 154 and its other end abuts the upper end of the adapter 160 to urge the member 150 upwardly against the member 140.

The springs 148 and 164 are designed so that their respective counteracting forces applied to the sealing members 140 and 150 normally maintain the latter members in a slightly-spaced position from the tapered bore portion 132a and the tapered surface defining the chamber portion 150c, respectively.

Fuel thus enters one of the bores 114 or 115 and passes through the housing portions 112a and 112b as indicated by the solid arrows in FIG. 3 before passing into the enlarged bore 152 in the housing portion 112b. It is understood that the above-mentioned hose assembly includes an outer hose that extends in the bore 152 and is connected to the openings 160b of the adapter 160 for receiving the fuel and passing it to a dispensing nozzle connected to the hose assembly for dispensing into the vehicle tank.

A cylindrical retaining collar 170 extends around the lower end portion of the housing portion 112a and the upper end portion of the housing portion 112b. The collar 170 has two inwardly-directed flanges 170a and 170b that extend in annular grooves formed in the housing portions 112a and 112b, respectively. The design of the collar 170 is such that it normally secures the housing portions 112a and 112b in the assembled position shown in FIG. 3 yet will break in response to a disengaging force in excess of a predetermined value being exerted on the coupling 110 to release the housing portion 112b from the portion 112a as will be described.

A radial bore 180 extends into the housing portion 112a and is adapted to be connected, at its end, to a conduit (not shown) extending from one of the above-mentioned underground storage tanks for passing vapor recovered from the above gasoline dispensing nozzle back to the storage tank. The other end of the bore 180 registers with the bore 146a of the flange 146.

It is understood that the above-mentioned hose assembly includes an inner hose extending in the enlarged bore 152 and connected to the bore 160c of the adapter 160 for introducing vapor from the vehicle tank into the latter bore. The vapor thus passes, through the housing portions 112a and 112b in a manner to be described and in a path shown by the dashed flow arrows before exiting though the bore 180 into a conduit connected to the bore for passage to a storage tank.

In operation, and assuming the coupling 110 is in its assembled condition of FIG. 3, when fluid is introduced to one of the ends of the bore 114 or into the bore 115, it flows into and through the interior of the chamber 120, as shown by the solid flow arrows. The fuel then flows through the passage defined between the tapered surface 142b of the sealing member 140 and the tapered bore portion 132a. From the latter passage, the fuel passes axially downwardly and through the annular space defined between the lower end portion of the sealing member 140 and the corresponding surface of the member 130 defining the tapered bore 132a.

The fuel then flows into the chamber 150 of the lower housing portion 112b and passes through the annular space defined between the upper end of the sealing member 154 and the corresponding surface of the housing portion 112b defining the chamber portion 150a. From the latter space, the fuel flows in the passage defined between the tapered outer surface of the member 154 and the corresponding surface of the housing portion 112b defining the chamber portion 150c. The fuel then exits the chamber 150 and flows through the openings 160b of the adapter 160 and into the aforementioned outer hose connected to the latter openings, for dispensing into the vehicle tank. It is understood that a pump would be provided to pump the fuel, in a conventional manner.

Vapor passes from the vehicle tank into the bore 160c of the adapter 160, via the above-mentioned inner hose also connected to the above dispensing nozzle. The vapor flows through the bore 160c, through the bore of the sealing member 154 into the bore 142a of the sealing member 140. From the latter bore the vapor passes into and through the bore 146a of the sealing member 140, through the bore 146a of the flange 146, and exits the coupling 110 via the bore 180 before it flows, via a conduit connected to the latter bore, to the underground storage tank. It is understood that a vacuum pump, or the like, would be provided, to induce this flow of vapor, in a conventional manner.

In the event a vehicle being serviced pulls away from the dispensing unit with the dispensing nozzle still inserted in the vehicle's tank, or with the nozzle or dispensing hose otherwise secured or hung on the vehicle, a force is exerted on the housing portion 112b by virtue of it being connected to the hose extending from the nozzle. This causes the collar 170 to break and thus releases the housing portion 112b from the housing portion 112a as shown in FIG. 4. In this released position, the sealing members 140 and 154 are no longer in engagement, and the spring 146 thus urges the sealing member 140 into sealing engagement with the tapered bore portion 132a to block any of the above-described flow of the fuel and the vapor through the housing portion 112a.

After the dispenser is turned off and the pressure is relieved, the housing portions 112a and 112b can be reassembled and the collar 170 replaced with a new collar which is used to reconnect the housing portions as described above.

The coupling of the embodiment of FIGS. 3, 3A, and 4 thus enjoys all of the advantages of the previous embodiment while accommodating a different configuration of the fuel and vapor hoses.

Figure 5:
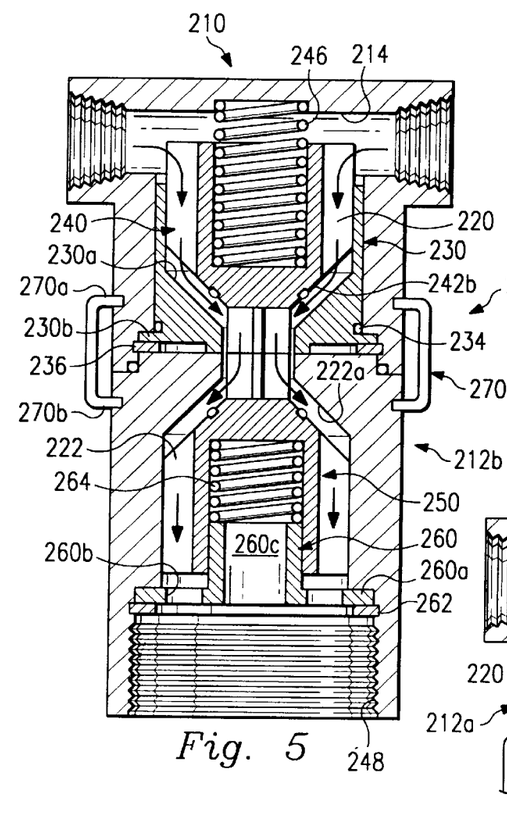
FIG. 5 is a sectional view of a coupling according to another alternative embodiment of an the present invention shown in its normal assembled condition.
Figure 5A:
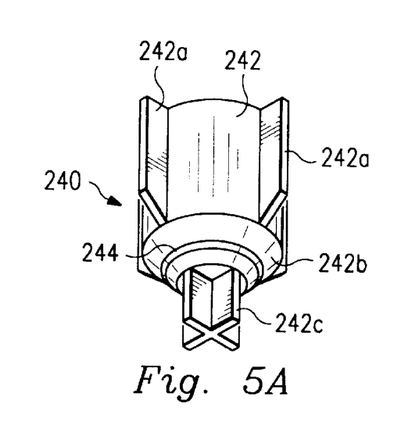
FIG. 5A is an isometric view of a component of the coupling of FIG. 5.
Figure 6:
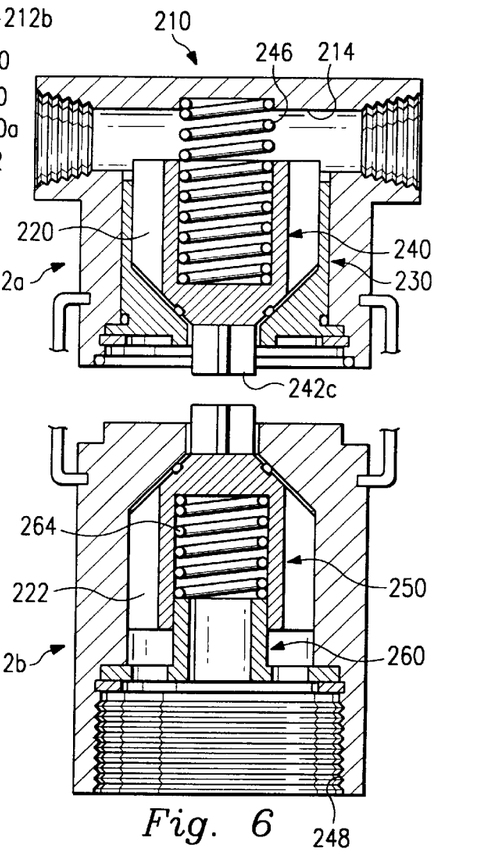
FIG. 6 is a sectional view of the coupling of FIG. 5 in its separated condition.

Another alternate embodiment of the present invention is shown in FIGS. 5, 5A, and 6 and is designed for gasoline dispensing systems that do not included a vapor recovery system. The coupling according to this embodiment is referred to, in general by the reference numeral 210 and includes an upper housing portion 212a as viewed in the drawing, and a lower housing portion 212b.

Although not shown in the drawings, it is understood that the upper housing portion 212a is bolted, or otherwise attached, to a dispensing unit at a gasoline service station, or the like; and the lower housing portion is connected to the upper housing portion in a manner to be described. The lower end of the housing portion 212a abuts the upper end of the housing portion 212b, and a seal ring 213 extends between the abutting ends.

The housing portion 212a has an enlarged upper end portion having a transverse bore 214 extending therethrough with its respective end portions being internally threaded for connection to two conduits (not shown). It is understood that two sources of gasoline, normally stored in underground storage tanks, are connected to these conduits and are selectively introduced to the respective ends of the bore 214 all in a conventional manner.

A chamber 220 is formed in the upper housing portion 212a and a cylindrical seating member 230 is disposed in the chamber and defines an internal tapered surface 230a. A seal ring 234 is provided in a groove formed in the outer surface of the member 230 and engages the corresponding inner surface of the housing portion 212a. An annular flange 230b is formed on the lower end of the seating member 230 which is engaged by a retaining ring 236 extending in a groove formed in the inner surface of the housing portion 212a to retain the member 230 in the chamber 220.

A sealing member 240 is mounted for reciprocal movement in the chamber 220 and is better shown in FIG. 5A. The member 240 is in the form of a cylinder 242 having four angularly-spaced wings 242a extending therefrom. The base 240b of the cylinder 242 has a tapered outer surface that corresponds to the tapered surface 230a of the member 230. A cross-piece 242c extends from the base 242b and has an X-shaped cross section.

A seal ring 244 is fitted in a groove formed in the outer surface of the base 242b of the cylinder 242. The base 242b normally extends with its tapered surface in a slightly-spaced relation to the tapered surface 230a of the member 230 to permit fuel flow therebetween, and the cross-piece 242c of the member 240 extends through the bore of the seating member 230. Also, the outer edges of the wings 242a extend in very close proximity to the inner wall of the housing portion 212a to guide and support the sealing member 240 during its reciprocal movement in the housing portion, as will be explained.

A spring 246 extends in the interior of the sealing member 240 with its upper end extending through the bore 214 and against a surface of the housing portion 212a defining the bore. The spring 246 urges the sealing member 240 downwardly, for reasons to be described.

The lower housing portion 212b defines a chamber 222 in its interior having a tapered portion 222a that defines a portion of the latter chamber. The lower end of the chamber 222 registers with an enlarged bore 248 formed in the lower end portion of the housing portion 212b. The bore 248 is internally threaded to enable it to be connected to a hose assembly (not shown) attached to a gasoline dispensing nozzle.

A sealing member 250 is mounted for reciprocal movement in the chamber 222 and, since it is identical to the sealing member 240, it will be not be described in detail. The sealing member 250 is disposed in the chamber 222 in an inverted position when compared to the sealing member 240, with the tapered base of the sealing member 250 normally in a slightly-spaced relation to the tapered surface 222a and with its upper end engaging the lower end of the sealing member 240.

An adapter 260 is disposed in the lower portion of the chamber 222 and has an outwardly-extending flange 260a at its lower end that is engaged by a retaining ring 262 that is secured in the upper end of the bore 248 to retain the adapter in the chamber. A plurality of angularly-spaced openings two of which are shown by the reference numeral 260b, are formed through the flange 260a that register with the chamber 222 and the bore 248.

The lower portion of the cylinder of the sealing member 250 extends over the upper end portion of the adapter 260 to support and guide the sealing member during its reciprocal movement in the chamber 222 for reasons to be described. A spring 264 extends in the interior of the sealing member 250 with its lower end abutting the upper end of the adapter 260 and its upper end engaging an inner surface of the member 250. Thus, the spring 264 urges the member 250 upwardly into engagement with the sealing member 240, for reasons to be described. The design is such that the counteracting forces applied by the springs 246 and 264 maintain the sealing members 240 and 250 in a slightly-spaced position from the tapered portion 230a of the member 230, and the tapered surface 222a in the lower housing portion 212b, respectively.

A cylindrical retaining collar 270 extends around the lower end portion of the housing portion 212a and the upper end portion of the housing portion 212b. The collar 270 has two inwardly-directed flanges 270a and 270b that extend in annular grooves formed in the housing portions 212a and 212b, respectively. The design of the collar 270 is such that it normally secures the housing portions 212a and 212b in the assembled position shown in FIG. 5 yet will break in response to a disengaging force in excess of a predetermined value being exerted on the coupling 210 to release the housing portion 212b from the portion 212a as will be described.

In operation, and assuming the coupling 210 is in its assembled condition of FIG. 5, when fluid is introduced to one of the ends of the bore 214, it flows into and through the chamber 220 and between the wings 242a of the member 240. The fuel then flows through the passage defined between the tapered surface 242b of the member 240 and the tapered surface 230a. From the latter passage, the fuel passes axially downwardly in the chamber 222 and around the cross-piece 242c of the member 240 and into the chamber 222 of the housing portion 212b.

The fuel then flows into and through a bore formed in the upper end portion of the lower housing portion 212b and around the cross-piece of the member 250 before passing through the passage defined between the tapered outer surface of the member 250 and tapered chamber portion 222a, as shown by the flow arrows. The fuel then flows through the chamber 222 and around the wings of the member 250 before flowing through the openings 260b and into the enlarged bore 248. The fluid then exits the coupling 210 through the aforementioned hose assembly connected to the openings 260b and to the nozzle for dispensing the fuel into a vehicle tank. It is understood that a pump, or the like, would be provided to pump the fuel, in a conventional manner.

In the event a vehicle being serviced pulls away from the dispensing unit with the dispensing nozzle still inserted in the vehicle's tank, or with the nozzle or dispensing hose otherwise secured or hung on the vehicle, a force is exerted on the housing portion 212b by virtue of it being connected to the hose extending from the nozzle. This causes the collar 270 to break and thus releases the housing portion 212b from the housing portion 212a as shown in FIG. 6. In this released position, the sealing members 240 and 250 are no longer in engagement, and the spring 246 thus urges the sealing member 240 into sealing engagement with the tapered surface 230a of the seating member 230. This blocks any of the above-described flow of the fuel through the housing portion 212a and thus prevents spillage of the fuel.

After the dispenser is turned off and the pressure is relieved, the body portions 212a and 212b can be reassembled and the collar 270 replaced with a new collar which is used to reconnect the housing portions as described above.

The coupling of the embodiment of FIGS. 5, 5A, and 6 thus enjoys all of the advantages of the previous embodiment while accommodating a different configuration of the fuel and vapor hoses.

Figure 7:
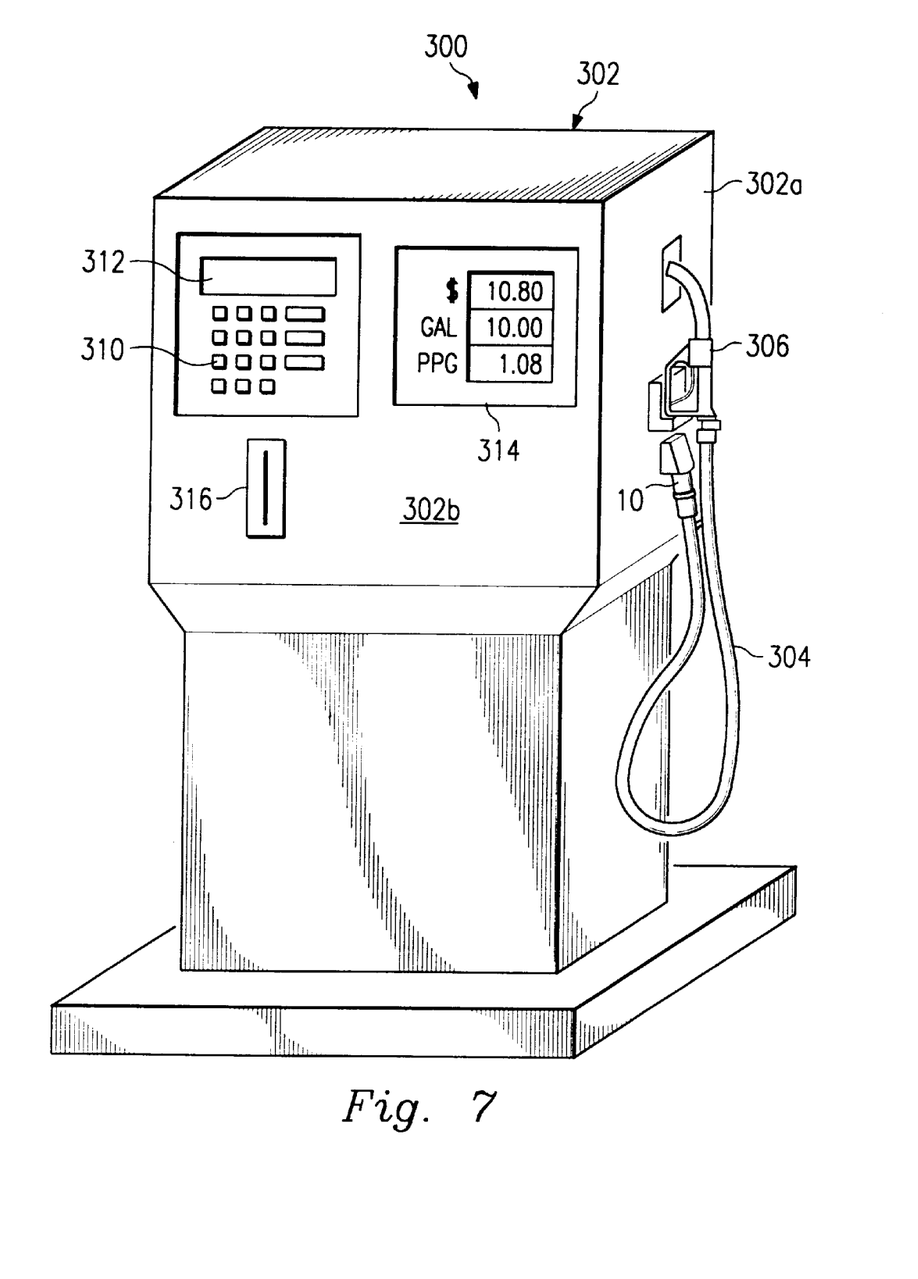
FIG. 7 is an isometric view of a gasoline dispensing unit incorporating the coupling of the embodiment of FIGS. 1, 1A, and 2.

The coupling 10 of the embodiment of FIGS. 1, 1A, and 2 is shown connected to a gasoline dispensing unit 300 in FIG. 7. The unit 300 includes a housing 302 having a side wall, or panel 302a, to which the housing portion 12a (FIG. 1) of the coupling 10 is rigidly connected in any known manner and with the housing portion 12b of the coupling being connected to the housing portion 12a in the manner described above. In this context, a portion of the housing portion 12a extends into the interior of the housing 302.

One end of a hose 304 assembly extends from the enlarged bore 18 (FIG. 1) of the housing portion 12b of the coupling 10, and a fuel nozzle 306 is connected to the other end of the hose for dispensing fuel to a vehicle tank.

It is understood that a plurality of conduits, or pipes, extend from an underground fuel storage tank (not shown) to the interior of the housing 302 where they are respectively connected to the ends of the bore 14 and to the end of the bore 15 internally of the housing. The coupling 10 can be mounted relative to the housing 302 in a manner so that the bores 14 and 15 extend in the interior of the housing 302 while the bore 18 extends outside the front panel of the housing.

The housing has a front panel 302b on which a keyboard 310, two conventional graphics displays 312 and 314, and a card reader 316 are mounted in a conventional manner. The graphics display 312 is designed to work in conjunction with the keyboard 310 to facilitate customer use of same, and the graphics display 314 includes a large, conventional, LCD panel for showing text and numerals, such as a price that corresponds to an amount of fuel dispensed, or other customer-related messages. The card reader 316 includes magnetic strip reading circuitry for reading credit cards, and the like, in a conventional manner. Although not shown in FIG. 7, It is understood that components identical to the components shown in FIG. 7 can also be mounted on a back panel of the housing 302 and another coupling, hose and nozzle can extend from the other side wall of the housing so that two customers can be serviced with the unit 300.

The coupling 10 thus functions in the manner described above to accommodate any vehicles pulling away from the dispensing unit 300 with the dispensing nozzle 306 still inserted in the vehicle's tank, or with the nozzle or dispensing hose 304 otherwise secured or hung on the vehicle. As a result, damage to the dispensing unit 300 and/or breakage of the dispensing hose 304 is prevented.

It is understood that variations may be made in the foregoing without departing from the scope of the invention. For example, the number of the above-mentions passages and opening can be varied within the scope of the invention. Also, the specific orientation of the coupling in each of the above embodiments and the reference to "upper" and "lower" is for the purpose of illustration only and does not limit the specific orientation or location of the couplings and their respective components. Also, the system and method of the present invention is not limited to a gasoline dispensing system but is equally applicable to any control system. Accordingly, it is appropriate that the appended claims be construed broadly and in a manner consistent with the scope of the invention.

What is claimed is:

1. A coupling for selectively passing two fluids, the coupling comprising:

a first housing having a first bore for passing one of the fluids therethrough and a second bore for passing the other fluid therethrough;

a seat formed in the first housing and surrounding the first bore;

a cylindrical guide flange formed in the first bore;

a first hollow cylindrical sealing member disposed in the first bore and extending over the guide flange for slidable movement relative to the guide flange, the sealing member receiving the fluid from the bore and having at least one window formed therethrough for discharging the fluid radially back into the bore;

a spring engaging the sealing member and normally urging the sealing member in a direction towards the seat;

a second housing having a first bore and a second bore;

a seat formed in the second housing and surrounding the first bore of the second housing;

a cylindrical guide flange formed in the first bore of the second housing;

a hollow cylindrical sealing member disposed in the first bore of the second housing and extending over the latter guide flange for slidable movement relative to the latter guide flange, the latter sealing member receiving the fluid from the first bore of the second housing and having at least one window formed therethrough for discharging the fluid radially back into the first bore of the second housing;

a spring engaging the latter sealing member and normally urging it in a direction towards the seat in the second housing; and a connector detachably connecting the second housing to the first housing with the first bores in registry and with the second bores in registry, and with the sealing members engaging in a manner to urge each other against the forces of their respective springs and away from their respective seats to permit passage of the fluid through the first bores;

the connector responding to a predetermined force acting on the second housing for allowing the second housing to disconnect from the first housing, the second sealing members to disengage from each other, and each sealing member to move into engagement with its corresponding seat to prevent fluid flow through the first bore of the first housing and the first bore of the second housing.

2. The coupling of claim 1 wherein the first bore of each of said housings has an inlet for receiving the one fluid, and wherein the corresponding guide flange registers with the inlet for receiving the one fluid and passing it into its corresponding sealing member.

3. A gasoline dispensing system comprising:

a dispenser connected to a source of fuel;

a nozzle for dispensing the fuel into a vehicle and for recovering vapors from the vehicle;

a hose assembly connected to the nozzle; and a coupling connecting the dispenser to the hose assembly for passing the fuel from the dispenser to the nozzle and for passing the vapor from the nozzle to the dispenser; the coupling comprising:

a first housing having a first bore for passing one of the fluids therethrough and a second bore for passing the other fluid therethrough;

a seat formed in the first housing and surrounding the first bore;

a cylindrical guide flange formed in the first bore;

a first hollow cylindrical sealing member disposed in the first bore and extending over the guide flange for slidable movement relative to the guide flange, the sealing member receiving the fluid from the bore and having at least one window formed therethrough for discharging the fluid radially back into the bore;

a spring engaging the sealing member and normally urging it in a direction towards the seat;

a second housing having a first bore and a second bore;

a seat formed in the second housing and surrounding the first bore of the second housing;

a cylindrical guide flange formed in the first bore of the second housing;

a hollow cylindrical sealing member disposed in the first bore of the second housing and extending over the latter guide flange for slidable movement relative to the latter guide flange, the latter sealing member receiving the fluid from the first bore of the second housing and having at least one window formed therethrough for discharging the fluid radially back into the first bore of the second housing;

a spring engaging the latter sealing member and normally urging the latter sealing member in a direction towards the seat in the second housing; and a connector detachably connecting the second housing to the first housing with the first bores in registry and with the second bores in registry, and with the sealing members engaging in a manner to urge each other against the forces of their respective springs and away from their respective seats to permit passage of the fluid through the first bores;

the connector responding to a predetermined force acting on the second housing for allowing the second housing to disconnect from the first housing, the second sealing members to disengage from each other, and each sealing member to move into engagement with its corresponding seat to prevent fluid flow through the first bore of the first housing and the first bore of the second housing.

4. The dispensing system of claim 3 wherein the first bore of each of said housings has an inlet for receiving the one fluid, and wherein the corresponding guide flange registers with the inlet for receiving the one fluid and passing it into its corresponding sealing member.

* * * * *